United States Patent
Luezlbauer et al.

(10) Patent No.: US 9,066,561 B2
(45) Date of Patent: Jun. 30, 2015

(54) APPARATUS AND METHOD BY MEANS OF WHICH AN ITEM OF FOOTWEAR IS ADAPTED

(75) Inventors: Adolf Luezlbauer, Steinbach am Attersee (AT); Alois Pieber, Hohenzell (AT); Franz Josef Resch, Schladming (AT)

(73) Assignee: Fischer Sports GmbH, Ried/Innkreis (AT)

( * ) Notice: Subject to any disclaimer, the term of this patent is extended or adjusted under 35 U.S.C. 154(b) by 374 days.

(21) Appl. No.: 13/702,733

(22) PCT Filed: Jun. 7, 2011

(86) PCT No.: PCT/AT2011/000253
§ 371 (c)(1),
(2), (4) Date: Dec. 7, 2012

(87) PCT Pub. No.: WO2011/153567
PCT Pub. Date: Dec. 15, 2011

(65) Prior Publication Data
US 2013/0074277 A1 Mar. 28, 2013

(30) Foreign Application Priority Data
Jun. 7, 2010 (AT) .................................. A 925/2010

(51) Int. Cl.
| A43B 5/04 | (2006.01) |
| A43D 3/00 | (2006.01) |
| A43B 5/16 | (2006.01) |
| A43B 7/28 | (2006.01) |
| B29L 31/50 | (2006.01) |

(52) U.S. Cl.
CPC ................ *A43D 3/00* (2013.01); *A43B 5/0429* (2013.01); *B29L 2031/501* (2013.01); *A43B 5/0415* (2013.01); *A43B 5/0435* (2013.01); *A43B 5/1666* (2013.01); *A43B 7/28* (2013.01); *A43B 5/0427* (2013.01)

(58) Field of Classification Search
CPC ...... A43B 5/0435; A43B 5/0429; A43B 7/28; B29L 2031/501; B29D 35/0063
USPC ....................... 425/2; 264/DIG. 30
See application file for complete search history.

(56) References Cited

U.S. PATENT DOCUMENTS 1,160,983 A * 11/1915 Hemenover ............... 425/405.1
3,613,271 A    10/1971 Geller
(Continued)

FOREIGN PATENT DOCUMENTS

| EP | 0 391 752 A1 | 10/1990 |
| FR | 2348665 A1 | 11/1977 |
| JP | S52130741 A | 11/1977 |
| JP | S629905 U | 1/1987 |
| JP | H0445408 U | 4/1992 |
| JP | H09207149 A | 8/1997 |
| WO | 02/28215 A1 | 4/2002 |
| WO | 2009/046477 A2 | 4/2009 |

*Primary Examiner* — Robert B Davis
(74) *Attorney, Agent, or Firm* — Laurence A. Greenberg; Werner H. Sterner; Ralph E. Locher

(57) ABSTRACT

An apparatus and a method for adapting a prefabricated item of footwear that is formed, at least in part, of hard thermoplastic material, to a user's foot and/or leg. A pressure-exerting element is provided that substantially encloses the item of footwear and that has an accommodating space into which the item of footwear can be placed. The accommodating space is bounded, at least in part, by a deformable material which forms an inner layer of the pressure-exerting element, which contains a cavity and has an inlet opening provided for the introduction of a pressure application fluid. The pressure-exerting element is formed with a portion into which the pressure application fluid cannot enter.

18 Claims, 5 Drawing Sheets

(56) References Cited

U.S. PATENT DOCUMENTS

| | | | |
|---|---|---|---|
| 4,964,229 A * | 10/1990 | Laberge | 36/93 |
| 6,994,532 B2 | 2/2006 | Vachon et al. | |
| 2002/0047228 A1 | 4/2002 | Vachon et al. | |
| 2003/0059490 A1 * | 3/2003 | Moore, Jr. | 425/2 |
| 2010/0236101 A1 | 9/2010 | Leitner et al. | |

* cited by examiner

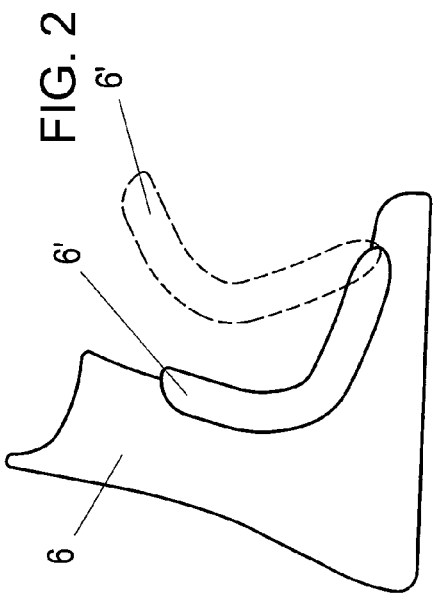
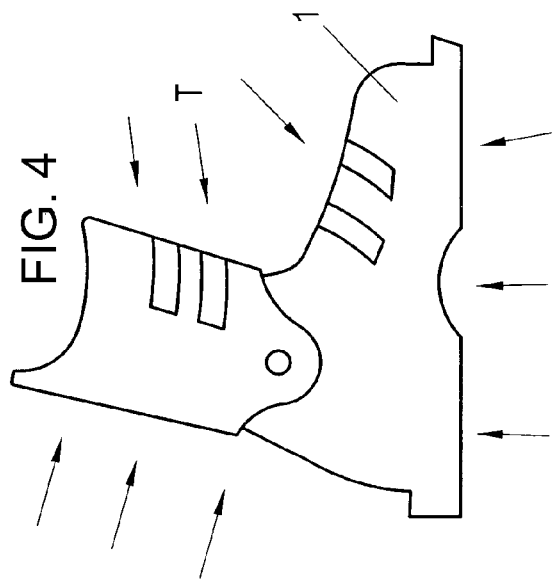
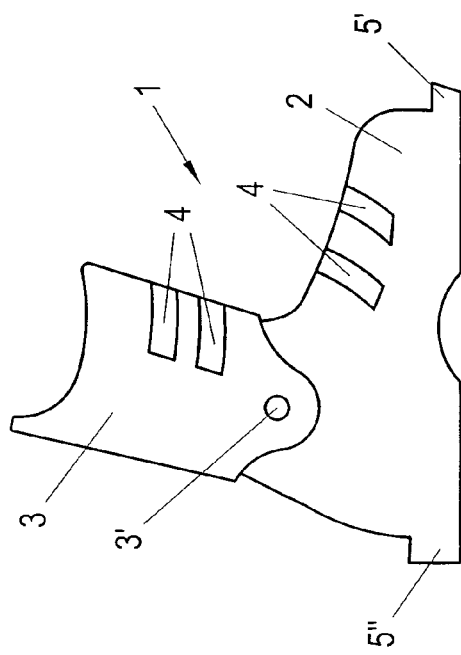
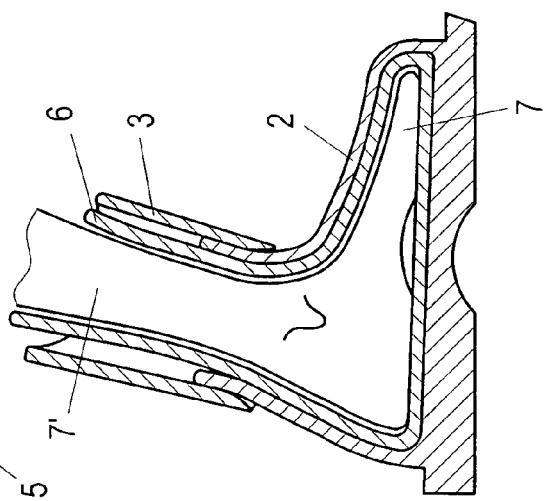

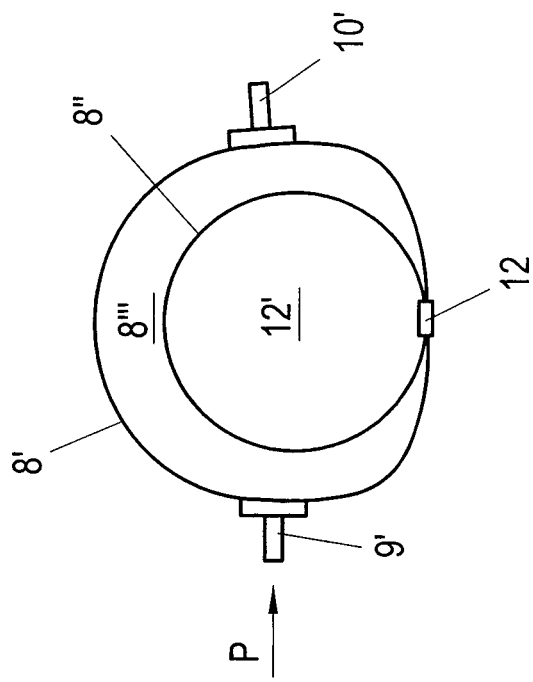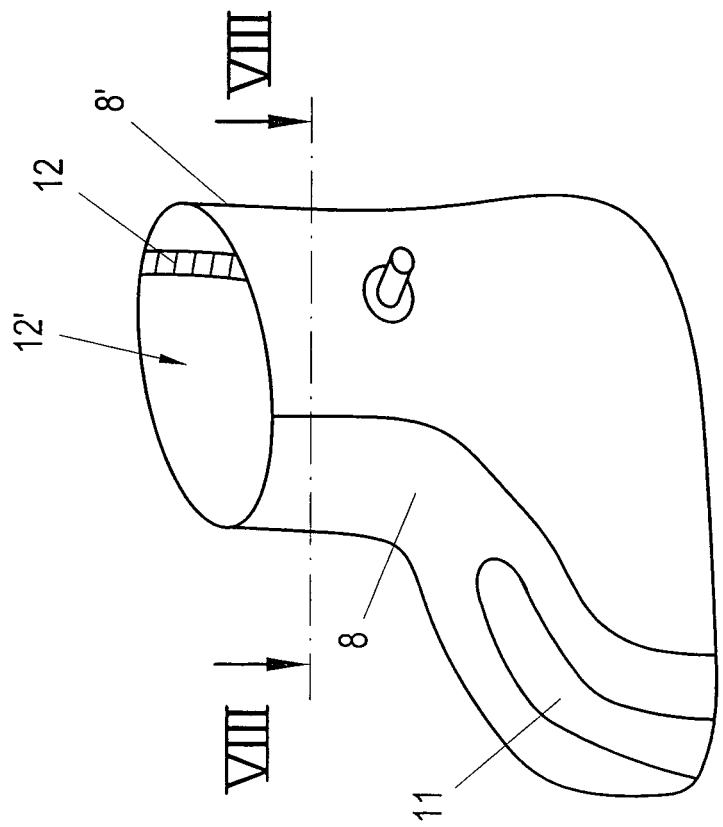
FIG. 8
FIG. 7

FIG. 12
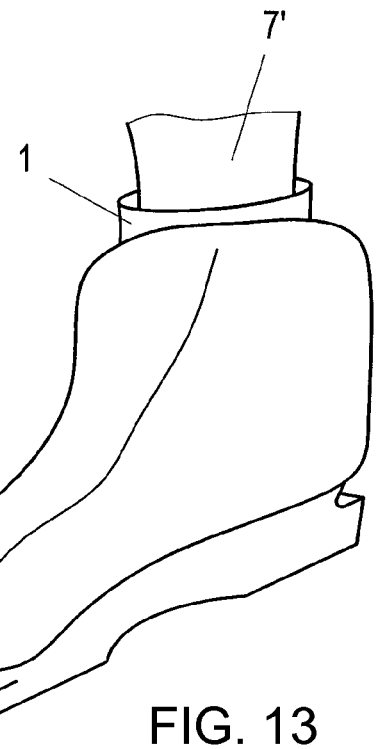
FIG. 13
FIG. 14
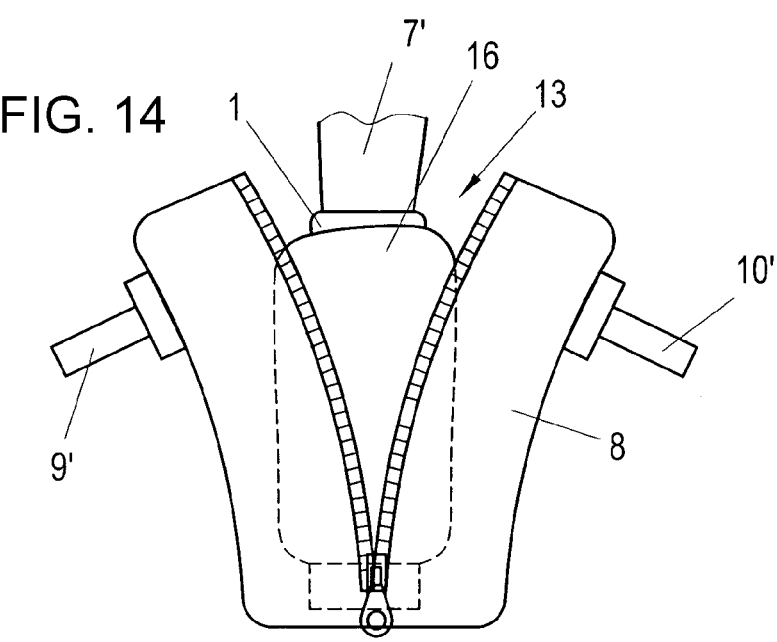

APPARATUS AND METHOD BY MEANS OF WHICH AN ITEM OF FOOTWEAR IS ADAPTED

BACKGROUND OF THE INVENTION

Field of the Invention

The invention refers to an apparatus for adapting a prefabricated item of footwear consisting, at least in part, of hard thermoplastic material to a user's foot and/or leg, and to a method for producing an item of footwear adapted to a user's foot and/or leg consisting of hard thermoplastic material to be used in sports, wherein at least part of a prefabricated item of footwear is heated and adapted by deforming said heated area by applying pressure from outside, and wherein said item of footwear is subsequently cooled.

A variety of methods for adapting a prefabricated item of footwear to a user's foot are known in the art. WO 2009/046477 A2 teaches to first heat the item of footwear, then put a sheet over the item of footwear after the user has put it on, and adapting the preheated shell to the foot by applying negative pressure. Basically, this method works without problems. However, disadvantageously, it has turned out that users are uncomfortable with applying negative pressure.

U.S. Pat. No. 3,613,271 discloses a method to fit a prefabricated item of footwear by applying manual pressure in the ankle region to fit the item of footwear to the user's foot. As an alternative to manual fitting pressure, a pressure sleeve may be provided in the ankle region, but said pressure sleeve is not described in greater detail. Such method requires the fitting operator to be highly skillful and knowledgeable in the field.

BRIEF SUMMARY OF THE INVENTION

Therefore, the aim of the present invention is to provide an apparatus and a method allowing even unskilled persons to simply and reliably adapt a prefabricated item of footwear to a user's foot and/or leg.

In the apparatus according to the present invention mentioned above, this aim is achieved by providing a pressure exerting element essentially enveloping the item of footwear and having an accommodating space intended for accommodating said item of footwear, said accommodating space being at least partly delimited by deformable material forming an inner layer of said pressure exerting element, which contains a cavity and has an inlet opening for introducing a pressure application fluid.

Using the apparatus according to the present invention, the item of footwear just needs to be put on and inserted into the accommodating space of the adapting apparatus. Subsequently, pressure application fluid, preferably air, is introduced into the cavity, which is made of deformable material on the inner side, i.e. on the side facing the item of footwear, and thus pressure is applied to the item of footwear from outside such that the areas where the foot is smaller than the prefabricated item of footwear are adapted to the foot by the pressure applied by means of the pressure exerting element. If the item of footwear has been heated above the softening temperature of the plastic material prior to insertion into the apparatus, the areas of the item of footwear having a smaller volume than the user's foot are forced apart as soon as the foot is inserted into the item of footwear, with the foot itself acting as a kind of pressing ram. If the pressure exerting element keeps up the pressure until the material has cooled down below its softening temperature, the item of footwear will retain the shape produced by the apparatus even after the pressure has ceased. Thus, it is not necessary to manually adapt the heated plastic material. An operator of the apparatus just needs to position the item of footwear in the accommodating space of the apparatus and introduce pressure application fluid. This means that adapting the item of footwear to a user's foot is simple and may also be accomplished by unskilled persons.

In order to reliably limit the pressure at which the pressure application fluid is introduced into the cavity, the inlet opening is advantageously equipped with an inlet valve, preferably in the form of a controllable pressure control valve.

If an outlet opening is provided, which is equipped with an outlet valve preferably in the form of a controllable pressure control valve, the pressure application fluid may be introduced and drained off (via the outlet opening) at the same time, resulting in the pressure exerting element providing a permanent flow of air. This means that cool fluid is constantly supplied while pressure is applied, thus accelerating the cooling process of the previously heated item of footwear. In order to ensure high pressure between the inlet and the outlet openings, the outlet pressure may be limited to e.g. about 0.6 bar, while the inlet pressure may be set at about 0.8 bar.

In order to form the cavity provided for receiving the application fluid, the pressure exerting element advantageously has an outer layer tightly bonded to the inner layer to form said cavity. In practice, it has proven cost effective and easy to produce a bag-shaped pressure exerting element essentially enveloping the item of footwear—except the opening for inserting the foot—comprised of at least two layers bonded to each other, i.e. an inner and an outer layer. Of course, the pressure exerting element may also be made of one single piece of adequately shaped deformable material, i.e. a single piece of material with the edges connected to each other. However, advantageously two layers are provided, with each individual layer serving its respective purpose. Namely, the inner layer appropriately consists of coated woven fabric, because it easily and cheaply provides a deformable material impermeable to the pressure application fluid, and it is therefore suitable for application to the outer surface of the item of footwear where pressure is applied. As the outer layer is not used for applying pressure to the item of footwear, it is sufficient for the outer layer to consist of a plastic sheet, particularly thermoplastic polyurethane, polyvinyl chloride or the like.

In order to avoid the entire surface of the item of footwear enveloped by the pressure exerting element from being pressurized when introducing the pressure application fluid, it may be advantageous to have areas of said inner and outer layers bonded face-to-face. Pressure application fluid cannot enter the area where the inner and the outer layers are bonded face-to-face, and thus pressure will not be applied to these areas of the item of footwear. Of course, areas the pressure application fluid will not reach may also be provided in other ways, e.g. by cutting out the pressure exerting element or by providing only a single layer in these areas.

It is particularly appropriate for the inner and the outer layers to be bonded face-to-face in a sole area intended for abutment in the area of a sole of an item of footwear. Pressurizing the sole area would disadvantageously result in undesirable changes in the prefabricated shape of the sole, thus jeopardizing the safe reception of the sole in a ski binding when forming the item of footwear as a skiing boot.

For easier accommodation of the item of footwear in the apparatus, the circumference of an entry opening connected to the accommodating space is advantageously enlargeable by opening at least one closing element.

In this context, advantageously a connecting area of said pressure exerting element, which area is closeable by the closing element, extends essentially from the entry opening to about the sole area. Such connecting area, which preferably extends from the user's calf to the heel region, allows the item of footwear to be introduced into the pressure exerting element essentially enveloping the item of footwear in its closed condition with particular ease. Thus, both easy entry and exit are provided, and the surface of the item of footwear may be pressurized broadly.

In order to limit the extension of the pressure exerting element on the outer side, i.e. on the side averted from the item of footwear, and in order to avoid sharp objects damaging the apparatus during practical use, the pressure exerting element is advantageously enveloped by an essentially pressure resistant sleeve. This outer, pressure resistant sleeve may e.g. be comprised of stable textile fabric.

The method as described above is characterized in that the heated item of footwear is inserted into a sleeve-like pressure exerting element essentially enveloping said item of footwear, said pressure exerting element being at least partly comprised of deformable material delimiting a cavity, and in that pressure application fluid is introduced into said cavity such that at least part of said item of footwear is adapted to the user's foot and/or leg.

As already explained with respect to the apparatus according to the present invention, the desired adaptation of the item of footwear consisting of hard, thermoplastic material to the user's foot may easily be achieved by providing a pressure exerting element essentially enclosing or enveloping the item of footwear such that contact pressure on the surface of the item of footwear may be exerted at least on the side facing the item of footwear by introducing a pressure application fluid.

In order to achieve a reliable, permanent adaptation of the prefabricated item of footwear using the pressure exerted by the foot from inside and by the pressure exerting element from outside, at least part of the item of footwear is advantageously heated, particularly in an oven, above the softening temperature of the material of the item of footwear before the user's foot is inserted into said item of footwear.

If the pressure application fluid is introduced into the pressure exerting element at an inlet pressure that is higher than the outlet pressure of the pressure application fluid drained off at the same time, a permanent flow of pressure application fluid may be achieved while pressure is applied, as explained above with respect to the apparatus according to the present invention, so that cool fluid keeps flowing, thus advantageously accelerating the cooling process of the previously heated item of footwear.

Moreover, in order to efficiently cool the previously heated item of footwear and thus quickly adapt it to the user's foot, a cooled collar is desirably put over said item of footwear, which collar covers at least part of said item of footwear, before said item of footwear is inserted into the pressure exerting element. The cooled collar may contain a cooling gel filled into a cavity formed by an advantageously deformable sheet. Optionally, said sheet may additionally have a cover made of deformable textile fabric. Such collar or gaiter is cooled prior to use in a cooling device, i.e. a freezer or the like, and may thus significantly accelerate the cooling process of the item of footwear.

With respect to efficiency of the process, the collar is advantageously put over the item of footwear immediately after the user has put on said item of footwear. Thus, after the cooled collar has been applied to the item of footwear, high pressure may subsequently be applied by the pressure exerting element, resulting in the inner layer of the pressure exerting element coming close and adapting to the outer surface of the collar. Subsequently, according to the principle of hydrostatic pressure, the cooled collar or the cooling gel introduced into the gaiter transfer the pressure from the pressure exerting element to the surface of the item of footwear. Contact between the collar and the heated surface of the item of footwear allows good conduction of heat, and as a consequence, the item of footwear will cool quickly, its shape being adapted to the user's foot.

In order to make the process cost effective and simple, advantageously air is introduced into said pressure exerting element as the pressure application fluid.

Hereinafter, the present invention will be described in greater detail with reference to the preferred embodiments depicted in the drawings, without the invention being restricted thereto.

In particular, in the drawings

BRIEF DESCRIPTION OF THE SEVERAL VIEWS OF THE DRAWING

FIG. 1 is a representation of an item of footwear consisting of hard, thermoplastic material;

FIG. 2 is a representation of an inner shoe or boot consisting of textile fabric to be received in the item of footwear of FIG. 1;

FIG. 3 is a sectional view of an item of footwear with a user's foot and/or leg inserted therein;

FIG. 4 is a schematic representation of the heating process of an item of footwear;

FIG. 7 is a perspective view of a pressure exerting element;

FIG. 8 is a sectional view according to line VIII-VIII in FIG. 7;

FIG. 12 is a perspective view of an item of footwear to be adapted;

FIG. 13 is a perspective view according to FIG. 12 with a cooling collar put over the item of footwear;

FIG. 14 is a representation similar to FIG. 10 with a cooling collar put over the item of footwear to be adapted;

DESCRIPTION OF THE INVENTION

Figure 6:
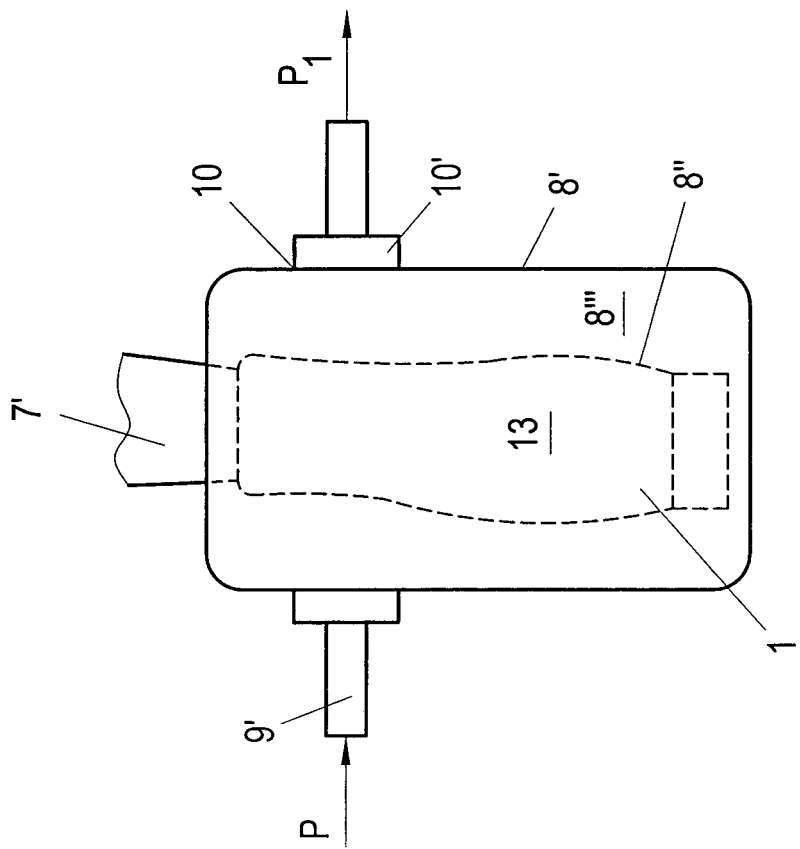
FIG. 6 is a representation according to the arrangement of FIG. 5, but of the heel and calf side of the item of footwear.

FIG. 1 shows a skiing boot 1 having a lower shell 2 covering the foot up to just above the ankle region, with a collar 3 hinged thereto via a connecting element, e.g. an articulated joint 3'. In addition, skiing boot 1 has the usual closing means 4, i.e. buckles, and a sole 5, which is usually integrally formed with said shell 2, said sole having a front connecting area 5' extending over lower shell 2 and a back connecting area 5" extending over lower shell 2 on the heel end to be received in a ski binding.

FIG. 2 shows an inner shoe or boot 6 having a tongue 6' that may be folded forward for easier entry; this forward folded position is represented by a dashed line in FIG. 2.

The sectional view in FIG. 3 shows that inner boot 6 is inserted into boot 1, and then the user's foot 7 and the lower region of the user's leg 7' are inserted into boot 1. Lower shell 2 and collar 3 are usually made of thermoplastic material; the prefabricated shape shown in FIG. 3 is prepared by injection molding. The inner boot 6, on the other hand, is usually made of textile material or leather and includes cushions intended to increase the user's comfort and to achieve a certain degree of adaptation of the hard boot 1, i.e. the outer shell, to the foot 7 and/or leg 7'.

As schematically represented in FIG. 4, boot 1 with or without inner boot 6 is subjected to heat e.g. in an oven or the like in order to heat the thermoplastic material, of which boot 1 is comprised, above the so-called softening temperature of the material. Depending on the material used, boot 1 is usually heated to a temperature between 70° C. and 140° C.

Figure 5:
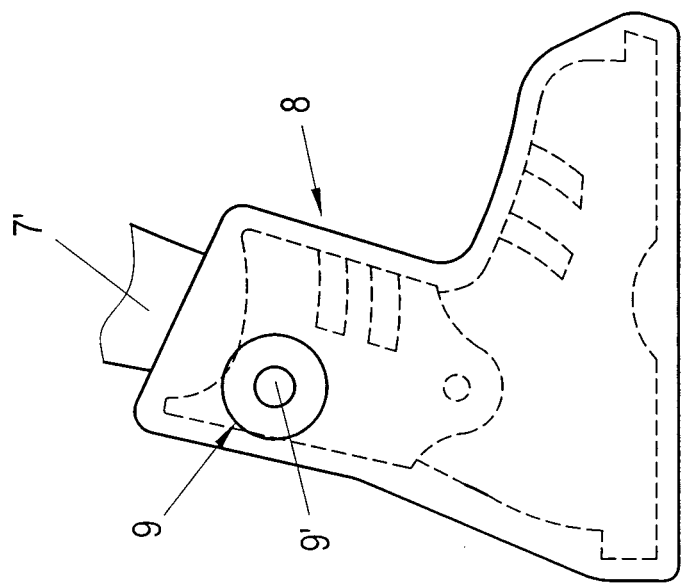
FIG. 5 is a representation of an item of footwear inserted in an apparatus according to the present invention.

Subsequently, the user inserts foot 7 and/or leg 7' into boot 1, preferably using inner boot 6, and closes boot 1 by means of buckles 4. Then the user puts heated boot 1 into pressure exerting element 8 represented in FIG. 5; this pressure exerting element is essentially formed as a bag or envelope and envelops the entire boot 1 except entry opening 12'.

Pressure exerting element 8 has an opening 9 housing a valve 9'. As schematically represented in FIG. 6, pressurized air may be introduced via valve 9' in the direction of arrow P into a cavity 8''' provided in pressure exerting element 8, such that high pressure builds up between inner layer 8' and outer layer 8'' (having opening 9) of pressure exerting element 8. Due to this high pressure, boot 1, i.e. both lower shell 2 and collar 3, are pressed against the user's foot 7 and/or leg 7'. The areas where the user's foot 7 and/or leg 7' are larger have already been pressed outward before, because foot 7 and/or leg 7' act like a pressing ram when entering heated boot 1. The areas where the user's foot 7 and/or leg 7' are smaller than the prefabricated boot are then compressed by the high pressure caused by the introduced pressurized air, by abutment of the inner layer 8'' and are thereby adapted to the shape of foot 7 and/or leg 7'. In order to maintain the shape of prefabricated boot 1 adapted to the user's foot 7 and/or leg 7', the boot is subsequently cooled down below the softening temperature in this adapted shape, preferably at least 10° C. below the softening temperature of the thermoplastic material of boot 1.

In order to accelerate the cooling process and to allow control of high pressure in cavity 8' at a given level, pressure exerting element 8 may have an outlet opening 10 having an outlet valve 10' in addition to inlet opening 9. Advantageously, both valves 9' and 10' are controllable such that e.g. inlet valve 9' may be set at a high pressure of about 0.8 bar and outlet valve 10' may be set at about 0.6 bar. As a consequence, a permanent flow of air is provided in pressure exerting element 8, constantly providing cool air while pressure is applied and thus accelerating the cooling process of previously heated boot 1.

As shown in perspective in FIG. 7, pressure exerting element 8 is not necessarily continuously made up of two layers, where the pressure medium, i.e. preferably air, may be introduced in between for applying pressure; for example, an area 11 may be provided in the upper forefoot region up to the instep bend where inner and outer layers 8', 8'' are bonded face-to-face. As a consequence, advantageously, pressure will not be applied to boot 1 in this area 11, thus making sure that even users having a high instep will not suffer any pressure sores in this area.

The sectional view of FIG. 8 particularly shows cavity 8''' formed between the outer and the inner layers, where pressurized air is introduced via inlet valve 9' and pressurized air may be drained off via outlet valve 10' if desired. In addition, the sectional view of FIG. 8 shows a closing element 12 in the form of a zipper.

According to a variant embodiment (not shown), part of (e.g. up to two thirds of its volume; definitely up to below inlet valve 9' and/or outlet valve 10') cavity 8''' of pressure exerting element 8 may be filled with preferably cold water. By introducing pressurized air, pressure exerting element 8 may be formed like a pressure vessel of a household water supply device. In this case, the air cushion above the water exerts pressure on the water, which, in turn, presses inner layer 8'' against the boot surface. The use of cold water allows heated boot 1 to cool down quickly.

Figure 9:
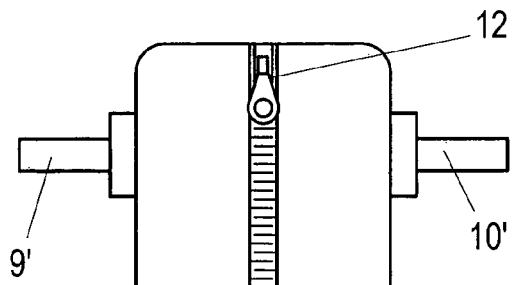
FIG. 9 is another representation of the apparatus showing a closing device extending from the entry opening to the sole area.
Figure 10:
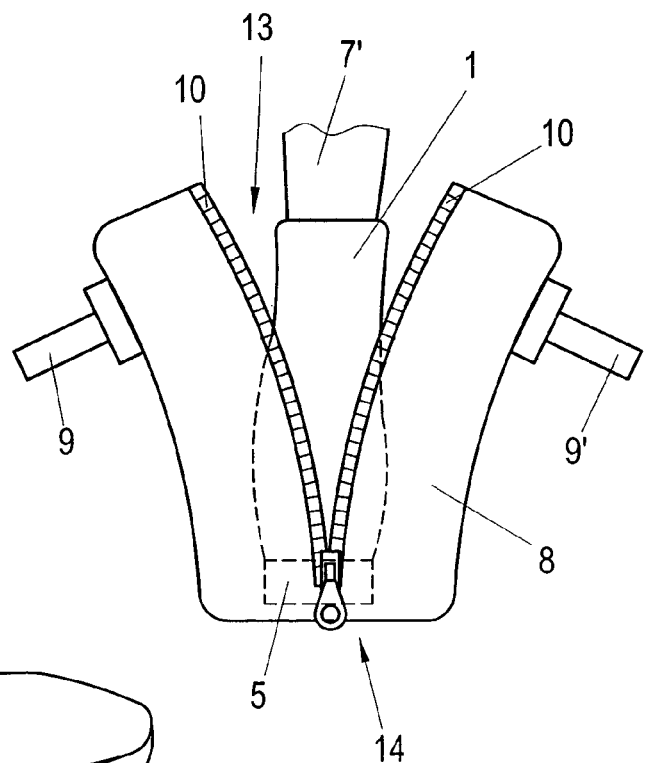
FIG. 10 is a representation corresponding to FIG. 9 wherein the closing device is open for the user's foot with the item of footwear to be inserted.

As can be seen particularly in FIGS. 9 and 10, the circumference of entry opening 12', which is connected to an accommodating space 13 of pressure exerting element 8 provided to accommodate boot 1, may be enlarged by providing closing element 12. This may considerably ease insertion of boot 1 into accommodating space 13 of pressure exerting element 8, as particularly shown in FIG. 10. Closing element 12, i.e. a zipper or a line of buttons, a line of snap fasteners, a Velcro, a laced fastening or the like, advantageously extends from entry opening 12' to a lower area 14 of pressure exerting element 8 where usually sole 5 of boot 1 is located in the operating position of the apparatus, as shown in FIG. 10. In this sole area 14 of pressure exerting element 8, just like in area 11, the outer and the inner layers 8'' are advantageously bonded face-to-face to avoid pressurized air from entering this area and to thus ensure that this area will not be deformed but rather retain its prefabricated shape. This will make sure that connecting areas 5', 5'' of sole 5 will be reliably received in a ski binding.

Figure 11:
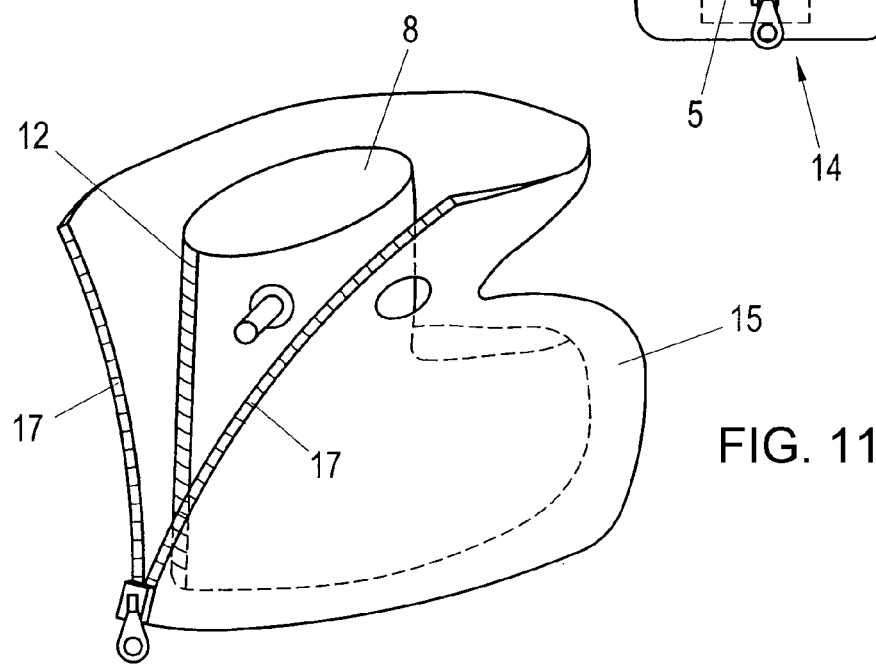
FIG. 11 is a perspective view of the apparatus, showing a sleeve enveloping the pressure exerting element.

In addition, FIG. 11 shows that pressure exerting element 8 may be received in a sleeve 15 enveloping pressure exerting element 8. Sleeve 15 may be comprised of stable textile fabric to support pressure element 8 after introduction of pressurized air along outer layer 8'. If such an outer sleeve 15 is provided, outer layer 8' may be made easily and cheaply of a thin, elastic sheet, e.g. thermoplastic polyurethane, polyvinyl chloride or the like. In this case, outer sleeve 15 will provide outside stability and protect the boot from damage by sharp objects or the like. Outer sleeve 15 has closing means 7 corresponding to closing means 12 and being arranged essentially adjacent in the closed area to allow easy entry into sleeve 15. Considering reliable and appropriate application of pressure to lower shell 2, collar 3 and buckles 4, inner layer 8'' is comprised of airtight coated woven fabric.

FIGS. 12 to 13 show another advantageous embodiment; FIG. 12 shows a boot 1 preheated above the softening temperature, similar to the embodiment in FIGS. 1 to 11. In this case, however, a collar or gaiter 16 is put over boot 1 immediately after the user has entered boot 1. This gaiter 16 contains a cooling agent, e.g. a cooling gel, filled into a cavity formed by deformable sheets. Gaiter 16 may optionally have a cover made of textile fabric. Prior to putting it over boot 1, gaiter 16 is cooled deeply in a cooling device, e.g. a freezer, and subsequently put on boot 1 to considerably accelerate the cooling process.

As shown in FIG. 14, the user, wearing preheated boot 1, then steps into accommodating space 13 of pressure exerting element 8, using cooling gaiter 16. Subsequently, pressure exerting element 8 is closed by closing means 12, and high pressure is applied by introducing pressurized air as described above, resulting in inner layer 8'' of pressure exerting element 8 coming to fit closely and adapt to the outer surface of cooling gaiter 16. The cooling gel contained in gaiter 16 then basically transfers the hydrostatic pressure from pressure exerting element 8 to the surface of boot 1.

Contact between cooling gaiter 16 and the heated boot surface results in very good heat conduction and allows boot 1 to cool quickly in the shape adapted to the user's foot 7 and/or leg 7'.

The invention claimed is:

1. An apparatus of adapting a prefabricated item of footwear to a user's foot or leg, the item of footwear consisting, at least in part, of hard thermoplastic material, the apparatus comprising:
 a pressure exerting element substantially enveloping said item of footwear in operation of the apparatus, said pressure exerting element having an accommodating space for accommodating the item of footwear;
 a deformable material at least partly delimiting said accommodating space and forming an inner layer of said pressure exerting element;
 an outer layer tightly bonded to said inner layer of said pressure exerting element and forming a cavity therebetween;
 an inlet opening in communicating relationship with said cavity for introducing a pressure application fluid into said cavity of said pressure exerting element;
 said pressure exerting element being formed with at least one area into which the pressure application fluid will not enter.

2. The apparatus according to claim 1, wherein said inner layer and said outer layer are bonded face-to-face in said at least one area into which the pressure application fluid will not enter.

3. The apparatus according to claim 1, wherein said pressure exerting element is formed with a cut-out in said at least one area into which the pressure application fluid will not enter.

4. The apparatus according to claim 1, wherein said pressure exerting element is formed as a single layer in said at least one area into which the pressure application fluid will not enter.

5. The apparatus according to claim 1, wherein said at least one area into which the pressure application fluid will not enter is located in a sole area provided for abutment at a sole of the item of footwear.

6. The apparatus according to claim 1, wherein said cavity is formed with an outlet opening provided with an outlet valve.

7. The apparatus according to claim 6, wherein said outlet valve is a controllable pressure control valve.

8. The apparatus according to claim 1, wherein said inner layer consists of coated woven fabric.

9. The apparatus according to claim 1, wherein said outer layer consists of a plastic sheet.

10. The apparatus according to claim 9, wherein said plastic sheet of said outer layer is formed of a plastic material selected from the group consisting of thermoplastic polyurethane and polyvinyl chloride.

11. The apparatus according to claim 1, wherein said accommodating space is accessible through an entry opening and said entry opening has a circumference that is enlargeable by opening at least one closure element.

12. The apparatus according to claim 11, wherein said at least one closure element is disposed to close a connecting area of said pressure exerting element extending substantially from said entry opening downward substantially to a sole area for placement of a sole of the item of footwear.

13. A method of producing an item of footwear adapted to a user's foot and/or leg, the method which comprises:
 providing a prefabricated item of footwear consisting of hard thermoplastic material to be used in sports;
 providing a pressure exerting element being at least partly comprised of deformable material delimiting a cavity formed between an inner layer that is tightly bonded to an outer layer of the pressure exerting element and formed to substantially envelope the item of footwear when the item of footwear is inserted into the pressure exerting element;
 heating at least a portion of the prefabricated item of footwear and inserting the at least partially heated item of footwear into the pressure exerting element;
 introducing pressure application fluid into the cavity for applying pressure from outside to thereby deform the heated area and adapt the item of footwear to the user's foot and/or leg, wherein at least one area of the pressure exerting element is formed such that pressure application fluid will not enter when the fluid is introduced into the cavity; and
 subsequently cooling the item of footwear.

14. The method according to claim 13, wherein the heating step comprises heating at least part of the item of footwear above a softening temperature of a material of the item of footwear and subsequently inserting the user's foot into the item of footwear prior to the step of introducing the pressure application fluid into the cavity.

15. The method according to claim 14, wherein the heating step comprises heating at least part of the item of footwear in an oven.

16. The method according to claim 13, wherein the introducing step comprises introducing the pressure application fluid into the pressure exerting element at an inlet pressure that is higher than an outlet pressure at which the pressure application fluid is drained off at the same time.

17. The method according to claim 13, which comprises placing a cooled collar over the item of footwear, the collar covering at least part of the item of footwear, prior to inserting the item of footwear into the pressure exerting element.

18. The method according to claim 17, wherein the step of placing the collar over the item of footwear is carried out immediately after the user's foot has been inserted into the item of footwear.

* * * * *